(12) United States Patent
Veldman et al.

(10) Patent No.: US 11,917,736 B2
(45) Date of Patent: Feb. 27, 2024

(54) DOUBLE ENDED RETROFIT LIGHT EMITTING DIODE, LED, BASED LIGHTING DEVICE FOR CONNECTION TO A POWER SOURCE, WHICH LED BASED LIGHTING DEVICE HAVING AN IMPROVED PIN-SAFETY CIRCUIT

(71) Applicant: SIGNIFY HOLDING B.V., Eindhoven (NL)

(72) Inventors: Paul Robert Veldman, Oss (NL); Raimundo De Heer Galisteo, Uden (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 187 days.

(21) Appl. No.: 17/636,863

(22) PCT Filed: Aug. 17, 2020

(86) PCT No.: PCT/EP2020/072976
§ 371 (c)(1),
(2) Date: Feb. 19, 2022

(87) PCT Pub. No.: WO2021/032667
PCT Pub. Date: Feb. 25, 2021

(65) Prior Publication Data
US 2022/0295616 A1     Sep. 15, 2022

(30) Foreign Application Priority Data
Aug. 20, 2019   (EP) .................................... 19192437

(51) Int. Cl.
*H05B 45/3578*   (2020.01)
*F21K 9/278*   (2016.01)
*H05B 45/50*   (2022.01)

(52) U.S. Cl.
CPC ......... *H05B 45/3578* (2020.01); *F21K 9/278* (2016.08); *H05B 45/50* (2020.01)

(58) Field of Classification Search
CPC .... H05B 45/3578; H05B 45/50; H05B 47/26; H05B 45/00; F21K 9/278; F21K 9/272; Y02B 20/30
See application file for complete search history.

(56) References Cited

U.S. PATENT DOCUMENTS 9,591,706 B2 *   3/2017   Chou ................... H05B 45/375
2011/0204823 A1 *   8/2011   Mizukawa ......... H05B 45/3725
315/308
(Continued)

FOREIGN PATENT DOCUMENTS

DE   202017107488 U1   3/2018
EP   2366948 A2 *   9/2011   ............... F21K 9/00
(Continued)

*Primary Examiner* — Abdullah A Riyami
*Assistant Examiner* — Syed M Kaiser (57) ABSTRACT

A double ended retrofit LED lighting device having two connecting terminals (L1, L2) at a first end for connection to a power source and two further connecting terminals (R1, R2) at a second end for further connection to said power source, the LED lighting device comprising: —at least one LED (D1) for emitting light, —an LED driver arranged for receiving an AC current from said power source and for driving said at least one LED based on said received AC current, —a filament circuit (RfilL) connected between said two connecting terminals (L1, L2) for supporting a filament current circulating back to said power source for indicating a presence of said LED lighting device to said power source, and—a pin-safety circuit comprising two pin-safety switches (SwLa, SwLb), wherein each pin-safety switch is connected to a respective separate terminal of said two connecting terminals (L1, L2) and comprises a changeover contact, wherein said changeover contact comprises: —a
(Continued)

central node (CC) arranged to be connected to said power source; —a normally-closed node (NC) arranged to be connected to said filament circuit (RfilL); —a normally-open node (NO) arranged to be connected to said LED driver, such that said filament circuit (RfilL) is functionally disconnected, when said AC current flows to, or from, said LED driver.

9 Claims, 4 Drawing Sheets

(56) References Cited

U.S. PATENT DOCUMENTS

| | | | |
|---|---|---|---|
| 2014/0328065 A1* | 11/2014 | Barnetson | F21K 9/23 |
| | | | 362/249.06 |
| 2016/0227622 A1 | 8/2016 | Ackermann et al. | |
| 2017/0108176 A1 | 4/2017 | Park | |
| 2018/0132331 A1 | 5/2018 | Segers et al. | |

FOREIGN PATENT DOCUMENTS

| | | | | |
|---|---|---|---|---|
| EP | 2366948 A2 | 9/2011 | | |
| WO | 2016005344 A1 | 1/2016 | | |
| WO | 2018153751 A1 | 8/2018 | | |
| WO | WO-2018153751 A1 * | 8/2018 | | F21K 9/278 |
| WO | 2019149950 A1 | 8/2019 | | |

* cited by examiner

DOUBLE ENDED RETROFIT LIGHT EMITTING DIODE, LED, BASED LIGHTING DEVICE FOR CONNECTION TO A POWER SOURCE, WHICH LED BASED LIGHTING DEVICE HAVING AN IMPROVED PIN-SAFETY CIRCUIT

CROSS-REFERENCE TO PRIOR APPLICATIONS

This application is the U.S. National Phase application under 35 U.S.C. § 371 of International Application No. PCT/EP2020/072976, filed on Aug. 17, 2020, which claims the benefit of European Patent Application No. 19192437.2, filed on Aug. 20, 2019. These applications are hereby incorporated by reference herein.

FIELD OF THE INVENTION

The present disclosure relates to a retrofit Light Emitting Diode, LED, based lighting device for connection to an electronic ballast and, more specifically, to a retrofit LED based lighting device having an improved pin-safety circuit.

BACKGROUND OF THE INVENTION

Lighting devices have been developed that make use of Light Emitting Diodes, LED's, for a variety of lighting applications. Owing to their long lifetime and high energy efficiency, LED lamps are nowadays also designed for replacing traditional fluorescent lamps, i.e. for retrofit applications. For such an application, a retrofit LED device is typically adapted to fit into the socket of the respective lamp fixture. Moreover, since the maintenance of a lamp is typically conducted by a user, the retrofit LED device should ideally be readily operational with any type of suitable fixture without the need for re-wiring the fixture.

Such a retrofit LED device is, for example, disclosed in US 2016/0081147. Here, an LED device is wired to receive the current that is input from any two electrode pins from among the pairs of pins at the ends of the tube, which house the driver circuitry. The input current is converted to DC through a rectifier circuit, is filtered of unwanted frequencies and voltage through a filter circuit, and is controlled with a step-down constant current circuit to drive an LED array within the tube.

Achieving good compatibility of retrofit LED lighting devices with electronic ballasts, for example High Frequency, HF, fluorescent ballasts, has proven to be a challenge, due to the wide variety of HF ballasts installed in the field. This is caused, amongst other, by the combination of having to assure start-up of the HF ballast, requiring no, or only a very high-ohmic DC impedance between both lamp ends, pin-safety, safe to touch the pins at one end of the lamp while the other end is inserted in the lamp-holder, and the filament impedance, i.e. the impedance between the two pins at each end of the lamp, mimicking a fluorescent lamp filament.

Particularly the latter is a challenge. The filament impedance is not allowed to be too low, as it may cause overheating in the HF ballast, but conversely may not be too high as it may cause overheating of the circuit elements inside the LED based lighting device, more particularly the resistors, used in implementing the filament impedance.

There are also HF ballasts, mostly for T5 lamp, i.e. having a tube diameter of ⅝ inch, that are designed to recognize the type of lamp they drive, and adjust the lamp current or power they deliver to that lamp accordingly. Almost all HF ballasts with lamp recognition perform the recognition by determining the filament impedance or resistance at the end of the filament preheat phase, just before ignition of the fluorescent lamp.

For fluorescent lamps, this may be considered the most accurate moment. The resistance of filaments in fluorescent lamps is temperature dependent. At the end of the pre-heat phase, the resistance has increased from a cold value R0 to a hot value RT, which is about 4 times R0. At the high filament temperature at the end of the pre-heat phase, the emitter material deposited on the filaments reaches thermionic emission, which enables smooth ignition of the fluorescent lamp at limited ignition voltage and causing little to no damage to the filaments.

In order to assure proper detection of the lamp type by an HF ballast, the filament impedance/resistance of a retrofit Led based lighting device may need to be the RT value of the fluorescent lamp type it is intended to replace. This is more restrictive than without lamp type recognition.

SUMMARY

It is an object of the present disclosure to provide for a retrofit Light Emitting Diode, LED, based lighting device having an improved pin safety circuit.

Further objects of the present disclosure include a method of operating such an LED based lighting device as well as a computer readable medium having instructions stored thereon which, when executed by a retrofit LED based lighting device, cause said device to implement a method in accordance with the present disclosure.

In a first aspect, there is provided a double ended retrofit Light Emitting Diode, LED, based lighting device for connection to a power source, said retrofit LED lighting device having two, separate, connecting terminals (L1, L2) at a first end of said LED lighting device for connecting said LED based lighting device to said power source, and having two, separate, further connecting terminals (R1, R2) at a second end for further connecting said LED based lighting device to said power source.

The double ended retrofit LED based lighting device comprising:
  at least one LED for emitting light;
  an alternating current, AC, LED driver arranged for receiving an AC current, from said power source, and for driving said at least one LED based on said received AC current,
  a filament circuit arranged in between said two separate, connecting terminals (L1, L2) for supporting a filament current circulating back to said power source for indicating a presence of said lighting device to said power source, and
  a pin-safety circuit comprising pin-safety switches, wherein each switch is connected to a separate terminal of said two connecting terminals (L1, L2) such that said AC current does not flow through said filament circuit when said pin-safety switches are closed.

The inventors have found that it may be beneficial if the AC current does not flow through the filament circuit when the LED based lighting device is switched on. This is accomplished by the introduction of the pin-safety switches connected to both the two, separate, connecting terminals (L1, L2). This may imply that each of the switches are connected, via a first side, to the respective connecting terminal and, via a second side, to electronics present in the LED based lighting device, for example the AC LED driver.

In prior art situations, the current, or at least part thereof, for powering the LED's flows through the filament circuit, even when the LED based lighting device is switched on. This causes heat to develop in the filament circuit, which is unwanted for many reasons.

The advantage of the retrofit LED based lighting device in accordance with the present disclosure is that, when the retrofit LED based lighting device is turned on, the filament circuit may be bypassed, as much as possible. That is, the filament circuit may not, or hardly, provide for a filament current which circulates back to the electronic ballast when the retrofit LED based lighting device is turned on.

The retrofit LED based lighting device may have an L1 and an L2 connecting terminal for receiving an AC current from a AC mains supply. The filament circuit may be placed in between the L1 and L2 connecting terminals. The L1 connecting terminal may be connected to a first input of the AC LED driver, i.e. the rectifier, and the L2 connecting terminal may be connected to a second input of the AC LED driver. In both these connections, i.e. L1 to AC LED driver and L2 to AC LED driver, pin-safety switches may be provided.

The above results in an operating modus in which, when the LED based lighting device is turned on, there is a direct connection between the AC mains supply and the AC LED driver, such that at least the current that is intended for the LED's does not flow through the filament circuit. This reduces the total losses in the LED based lighting device.

As mentioned above, the pin-safety circuit in accordance with the present disclosure is intended for assuring safety during instalment of the retrofit LED based lighting device. Hazardous situation may occur when a first end of the LED based lighting device is installed in a fixture and the other end of the LED based lighting device is floating. In such a case, it may be possible that a hazardous voltage is induced at the pins of the floating end of the LED based lighting device.

The pin-safety circuit in accordance with the present disclosure is arranged to deal with the above described situation. The pin-safety circuit may assure that there is no, or at least a very high ohmic, electrical connection between the first end of the retrofit LED based lighting device and the opposite, other, end. Only when both ends of the retrofit LED based lighting device have been properly installed, the pin-safety circuit will cancel the open, or high ohmic, connection. That is, the electrical connection between both ends of the retrofit LED based lighting device is restored. This is accomplished, in accordance with the present disclosure, by closing both pin-safety switches in the two, separate, connecting terminals (L1, L2).

It is noted that the retrofit LED based lighting device is suitable for connecting to a power source. Preferably, the power source is a High Frequency, HF, ballast. Other types of power sources include a mains supply, for example 230Vac, or an EM ballast.

In an example, the safety switches are normally-open switches comprised by a single relay.

One of the advantages hereof is that these variants are normally available at almost no extra cost compared to single pole relays. In such a way, a pin safety solution is created in which the ON state LED current does not flow through, or at least part of, the filament impedance, avoiding associated ON state dissipation in the filament circuits.

In a further example, the pin-safety circuit comprises two in series cascaded pin-safety switches connected to each of said two, separate, connecting terminals (L1, L2).

The above described example adds single fault tolerance aspects to the present disclosure. The two switches as described above are effectively in parallel, from the perspective of pin-safety. Each of the above described pin-safety switches may have two switches in series. For single fault tolerance, the second, series switches may need to be from a separate relay, or other type of switch, for safety purposes.

In a further example, the retrofit LED lighting device further comprises:
a capacitor, preferably a safety capacitor, connected in parallel over said pin-safety switches, for providing said retrofit LED lighting device with a reduced amount of power for controlling said pin-safety switches when said pin-safety switches are open.

The pin-safety switches may be controlled by digital control logic. The digital control logic may need to be powered from the power source as well, or using a battery or anything alike. In order to ensure that sufficient power is available for controlling the pin-safety switches, a capacitor, preferably a safety capacitor, or two or more safety capacitors, may be provided. The safety capacitors may be selected such that sufficient power is provided to the digital control logic, but that the amount of power that is received from the power source cannot harm any person touching any of the pins, while being live.

The benefit of a safety capacitor is that there will be no hazardous situation in case the capacitor would fail, for whatever reason.

In accordance with the present disclosure, the retrofit LED lighting device is a double-ended retrofit LED lighting device, wherein at each opposing end of said retrofit LED based lighting device, said device may comprise a filament circuit.

In the context of the present disclosure, the following is defined. The double ended retrofit LED based lighting device may comprise a single pin-safety circuit, which pin-safety circuit may comprise components at both ends of the retrofit LED based lighting device. The double ended retrofit LED based lighting device may further comprise a filament circuit at a first end of said lighting device, and a further filament circuit at a second end, opposite to said first end, of said lighting device.

In another example, the retrofit LED based lighting device comprises:
a further filament circuit arranged in between said two separate, further connecting terminals (R1, R2) for supporting a filament current circulating back to said power source for indicating a presence of said lighting device to said power source, and wherein said pin-safety circuit comprises further pin-safety switches, wherein each further switch is connected to a separate further connecting terminal of said two, separate, further connecting terminals (R1, R2) such that said AC current does not flow through said further filament circuit when said further pin-safety switches are closed.

The above described example also adds single fault tolerance aspects to the present disclosure.

The retrofit LED lighting device may comprise a further capacitor connected in parallel over said further pin-safety switches connected to both said two, separate, further connecting terminals (R1, R2) for providing said retrofit LED lighting device with a reduced amount of power for controlling said pin-safety switches, when said switches are open.

In yet another example, at least one of said pin-safety switches comprises a changeover contact, wherein said changeover contact comprises:

a central node arranged to be connected to said power source;

a normally-closed node arranged to be connected to said corresponding filament circuit;

normally-open node arranged to be connected to said AC LED driver, such that said filament circuit is functionally disconnected, when said AC current flows to, or from, said AC LED driver.

In addition to the above, at least one of said further pin-safety switches may also comprise a changeover contact, wherein said changeover contact comprises:

a central node arranged to be connected to said power source;

a normally-closed node arranged to be connected to said corresponding filament circuit;

normally-open node arranged to be connected to said AC LED driver, such that said further filament circuit is functionally disconnected, when said AC current flows to, or from, said AC LED driver.

One of the advantages of the above described example is that once the AC current starts flowing, the filament circuit may be effectively electrically disconnected from the rest of the electronics. One of the switches may thus be formed as a switch having three nodes, wherein either a connection between the filament circuit and the power source is provided, or a connection between the rest of the LED based lighting device, i.e. the rectifier and the LED's, and the power source is provided.

Such a switch allows the filament circuit to become functionally disconnected once the AC current starts flowing through the LED based lighting device.

In a further example, the LED based lighting device further comprises:

an impedance matching circuit for matching an input impedance of said AC LED driver to an output impedance of said power source.

Impedance matching may be beneficial for improving the power transfer between the power source and the LED based lighting device, or to reduce signal reflection from the LED based lighting device back to the power source.

Here, the impedance matching circuit may comprise at least one of:

an inductor placed behind an output of said AC LED driver;

an inductor with two magnetically coupled windings, wherein each winding is connected to a separate terminal of any of:

said two, separate, connecting terminals or said further connecting terminals;

at least two inductors, wherein each of said two inductors is connected to a separate terminal of said connecting terminals or of said further connecting terminals.

The inductor may, for example, be placed in series with the at least one LED, or may be placed in series with a combination of the at least one LED cascaded in parallel with any other electronic component. This is, for example, shown in FIG. 5 where the buffer capacitor is connected in parallel over the at least one LED. As such, the inductor is placed at the DC side of the rectifier. The benefit of hereof is that only one signal inductor may be used as the impedance matching circuit.

The inductor may also be implemented as an inductor with two magnetically coupled windings connected to any of the two, separate, connecting terminals or the further connecting terminals. In this case, the inductor is placed at the AC side of the LED based lighting device.

In accordance with the present disclosure, two, non-magnetically coupled inductor parts may also be used.

In a further example, the said impedance matching circuit comprises two impedance matching capacitors, wherein each of said two impedance matching capacitors connects to a separate terminal of said two, separate, connecting terminals (L1, L2) and to a separate terminal of said two, separate, further connecting terminals (R1, R2).

It is noted that the retrofit LED based lighting device, in accordance with the present disclosure, may be shaped as a tube for replacing traditional fluorescent tube lamps. In such a case, the two connecting terminals (L1, L2) are oriented at a first end of the tube and the further connecting terminals (R1, R2) are oriented at a second end, opposite to the first end, of the tube. This entails that an electrical connection is to be made which spans over most of the length of the tube for realizing that each of the two capacitors connects to one of the two, separate, connecting terminals (L1, L2) to one of the two, separate, further connecting terminals (R1, R2), as described above.

In an example hereof, a first of said two impedance matching capacitors comprises two capacitors placed in series between one of said two, separate, connecting terminals (L1, L2) and one of said two, separate, further connecting terminals (R1, R2); and a second of said two impedance matching capacitors comprises two capacitors placed in series between another one of said two, separate, connecting terminals (L1, L2) and another one of said two, separate, further connecting terminals (R1, R2), wherein a center tap of said two capacitors in series between one of said two, separate, connecting terminals (L1, L2) and one of said two, separate, further connecting terminals (R1, R2 is connected to a center tap of said two capacitors placed in series between another one of said two, separate, connecting terminals (L1, L2) and another one of said two, separate, further connecting terminals (R1, R2).

The advantage of the above is that only a single electrical connection, i.e. wire or track or anything alike, needs to span the length of the retrofit LED based lighting device. There is no need for two electrical connections. The single electrical connection may be composed of a single wire, track, or anything alike, that connects the center tap of the two capacitors placed in series between said two, separate, connecting terminals (L1, L2) with the center tap of the two capacitors placed in series between said two, separate, further connecting terminals (R1, R2). This thus reduces complexity and costs for realizing a retrofit LED based lighting device.

In a second aspect, there is provided a method for operating a retrofit Light Emitting Diode, LED, based lighting device in accordance with any of the previous claims, wherein the method comprises the steps of:

receiving, by said AC LED driver, from said power source, an AC current;

driving, by said AC LED driver, said at least one LED based on said received AC current;

supporting, by said filament circuit, said filament current to circulate back to said power source for indicating a presence of said lighting device to said power source, and controlling, by said pin-safety circuit, said pin-safety switches connected to both said two, separate, connecting terminals (L1, L2) such that said AC current does not flow through said filament circuit when said pin-safety switches are closed.

It is noted that the advantages and definitions as disclosed with respect to the embodiments of the first aspect of the invention also correspond to the embodiments of the second aspect of the invention, being the method of operating a retrofit Light Emitting Diode, LED, based lighting device.

In a third aspect, there is provided a computer program product, comprising program code means stored on a computer readable medium, said program code means arranged to perform said method according to the second aspect as provided above, when executed by a retrofit LED based lighting device.

These and other aspects of the invention will be apparent from and elucidated with reference to the embodiment(s) described hereinafter.

DETAILED DESCRIPTION

Fluorescent TL tubes are inherently safe because the gas inside the tube first has to be ignited before there is a conductive path between the two ends of the tube. The tube is connected to an Alternating Current, AC, mains voltage power supply such as the ones commonly found in domestic buildings. The tube or the fixture into which the tube is installed may comprise additional elements such as a ballast and a jumper or a starter element.

This safety is necessary when the tube is being installed into a fixture while the lamp sockets are energized, i.e. the live voltage is present. In the situation when one end of the tube is inserted to the socket and energized and the other end not, the pins of the free end shall not become live.

With gas filled fluorescent tubes this is not a problem, but when using LED lighting devices there is a conductive path between the two ends of the tube as indicated with L1/L2 and R1/R2. When the pins are touched by a human, i.e. a human body is present in the power loop, the internal LED driver tends to conduct a current, which usually exceeds a safety limit and causes a shock hazard.

A known solution to this problem is to apply the mains input only at one side of the tube. The other side is thus galvanically isolated from the mains. In this case there is no conductive path between the two sides of the tube, but the glow starter must be replaced by a short to get the lamp to work.

More specifically, in some applications it is not allowed that the retrofit LED lighting device exhibits a substantial asymmetry under single fault conditions. Particularly, a diode in the rectifier becoming an open may create such condition. In some retrofit LED lighting devices, each diode in the rectifier may then be paralleled by a second diode.

The present disclosure is directed to a double-ended retrofit LED based lighting device, where the power source is to be connected to both ends of the retrofit LED based lighting device, i.e. to L1/L2 and to R1/R2.

Figure 1:
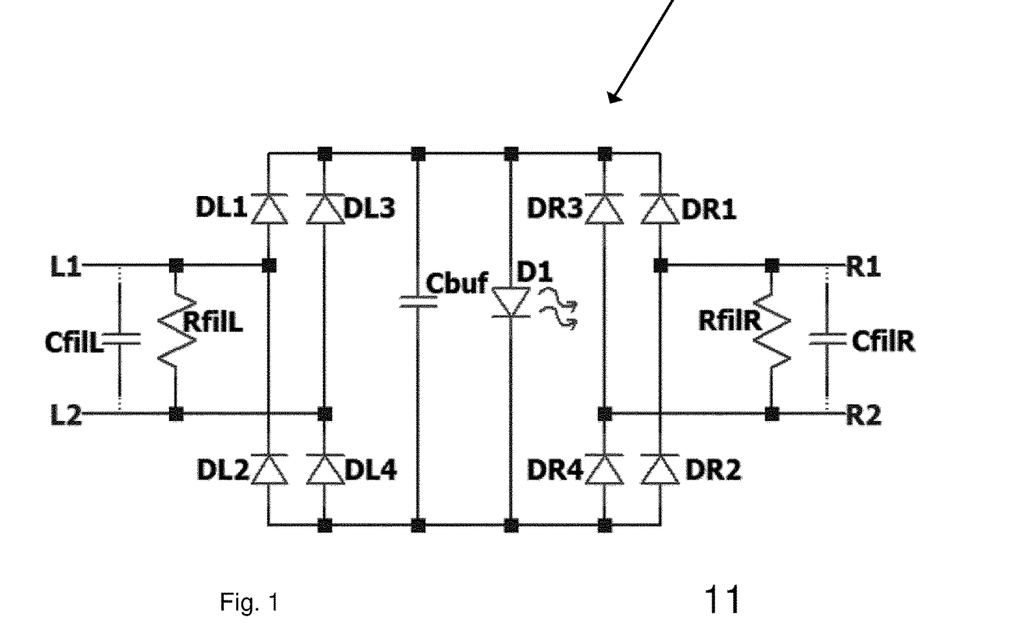
FIG. 1 shows a commonly used prior art TLED lighting device retrofit solution.

A known double-ended retrofit LED based lighting device 1 is shown in FIG. 1.

Here, the parts of the AC current flowing via either pin, for example entering via L1 and/or L2 and exiting via R1 and/or R2, can directly flow via the rectifier to the output thereof. No part of the AC current needs to flow via the filament circuit or parts thereof. Thus, losses in the filament circuits due to this AC current are substantially avoided. However, the prior-art circuit of FIG. 1 as shown, cannot easily be combined with a pin-safety switch Sw and/or a matching impedance. Additionally, when used with a dimmable HF fluorescent ballast, the filament heating current during dimming can still substantially overheat the Rfil filament resistors.

Figure 2:
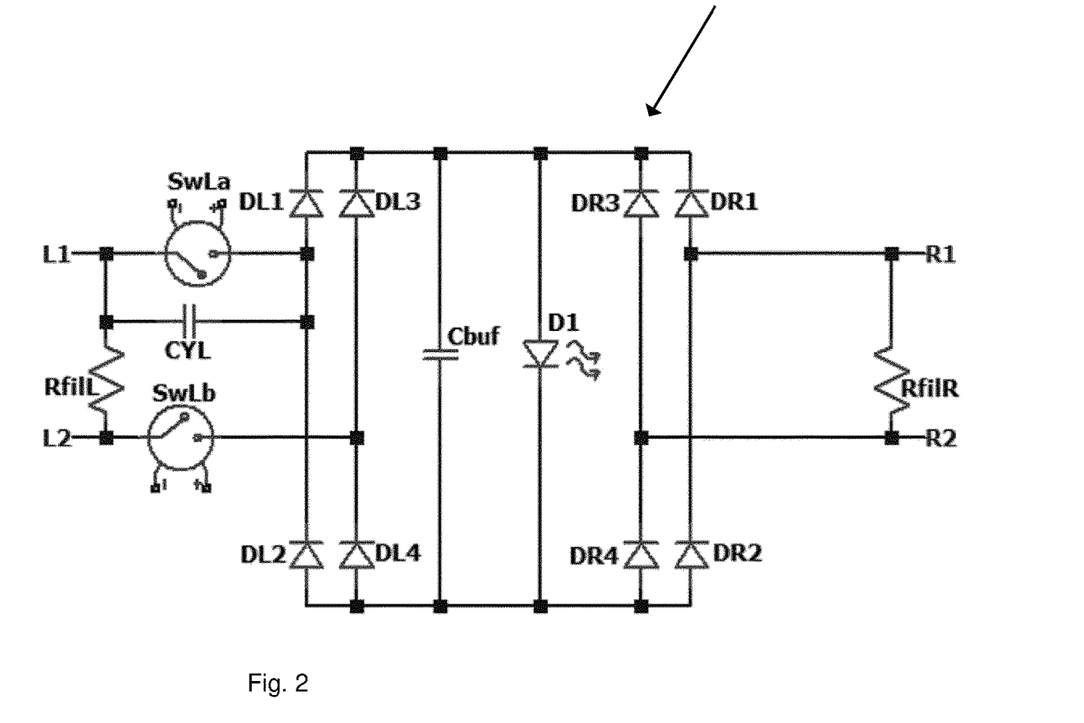
FIG. 2 shows a retrofit LED based lighting device in accordance with the present disclosure.

FIG. 2 shows a retrofit LED based lighting device 11 in accordance with the present disclosure.

It is the object of the present disclosure to provide a circuit for retrofit LED based lighting devices that provide a solution to the above mentioned issues and challenges, maximizes compatibility with the installed base of HF fluorescent ballasts and may also allow dimming of the retrofit LED based lighting device, for example an TLED lamp.

By putting a pin-safety switch in both the L1 and L2 pin connection to the rectifier, pin safety is achieved and it is still prevented that at least a part of the AC current flows through the filament impedance, Rfill. The inventors have found that pin safety may be achieved by incorporating at least two switches, a switch in the L1 pin connection to the rectifier and a switch in the L2 pin connection to the rectifier. These switches may be controlled with the same control signal such that they provide for the same behavior. This ensures that, by using these switches, the first end of the lighting device may be electrically disconnected from the other, opposite, side of the lighting device.

Preferably, SwLa and SwLb are two normally-open contacts of a single relay. The location of the Cy capacitor may not be critical. It may be as depicted, placed across SwLb, from L1 to the DL3, DL4 node or from L2 to the DL1, DL2 node.

In FIG. 2, two pin-safety switches are used, each connecting the pins at one end of the LED lighting device to an input of the rectifier. Like in FIG. 2, with the pin-safety switches closed, the AC current can flow via any pin directly to/from the rectifier, without having to flow, in part or in whole, through the filament impedance.

Thus, a pin safety solution is created in which the on-state AC current does not flow through, part of, the filament impedance, avoiding associated on-state dissipation in the filament circuits.

As stated earlier, "the" pin-safety switch often is implemented as a series connection of two switches for reasons of single fault tolerance. As the two switches SwLa and SwLb are effectively in parallel from the perspective of pin-safety, each of the two switches may then have two switches in series. For single fault tolerance, the second, series switches may be from a separate relay, or other type of switch.

Figure 3:
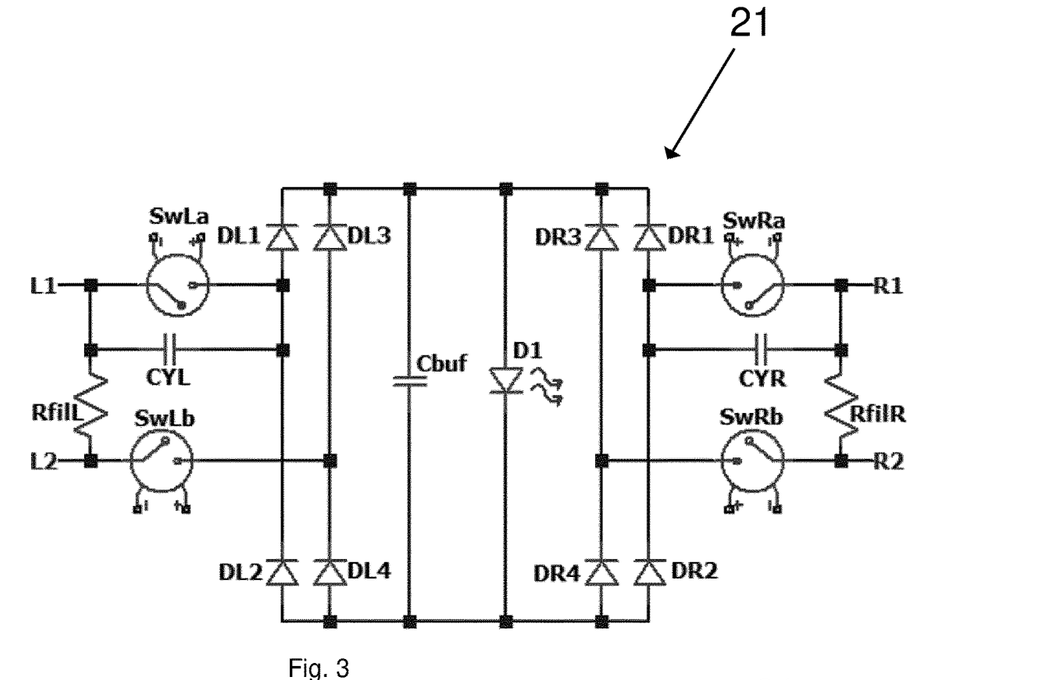
FIG. 3 shows a retrofit LED based lighting device in accordance with the present disclosure.

As an alternative, two extra switches may be connected at the opposite end of the LED lighting device, as shown in the LED lighting device 21 of FIG. 3.

A second set of pin-safety switches may provide single-fault tolerance. Placing that second set at the other end of the lamp creates symmetry between both LED lighting device ends and may allow the relays to be physically placed at different ends of the lamp.

A second CY capacitor CYR may need to be added to create a current path for detecting proper lamp insertion while the pin-safety switches are open. As now CYL and CYR are effectively in series, the CY capacitors may not need to be safety type capacitors; if one becomes a short, there is still the other CY capacitor that is operating correctly. As such, the retrofit LED based lighting device is still single fault tolerant.

The two relays may be activated by shared detection and drive signals, a shared detection signal and individual drive signals, or by individual detection and drive signals.

Thus a single fault tolerance is added to the earlier pin safety solution in which the on-state AC current does not flow through (any part of) the filament impedance, avoiding associated on-state dissipation in the filament circuits.

A further insight is, that the multiple relay output contacts often are available as a changeover contact, having three nodes; a central node CC, a normally-closed node NC, connected to the central node CC when the relay is not activated and disconnected from the central node when the relay is activated, and a normally-open node NO, disconnected from the central node when the relay is not activated and connected to the central node when the relay is activated. Relay variants with changeover contacts are available at almost no extra cost compared to variants having just normally-open or normally closed contacts.

This now allows to change at least one of the two switches Sw at each end of the LED lighting device into a changeover contact, and permits to effectively electrically remove the filament circuit(s) from the rest of the circuit when the relays are activated.

Figure 4:
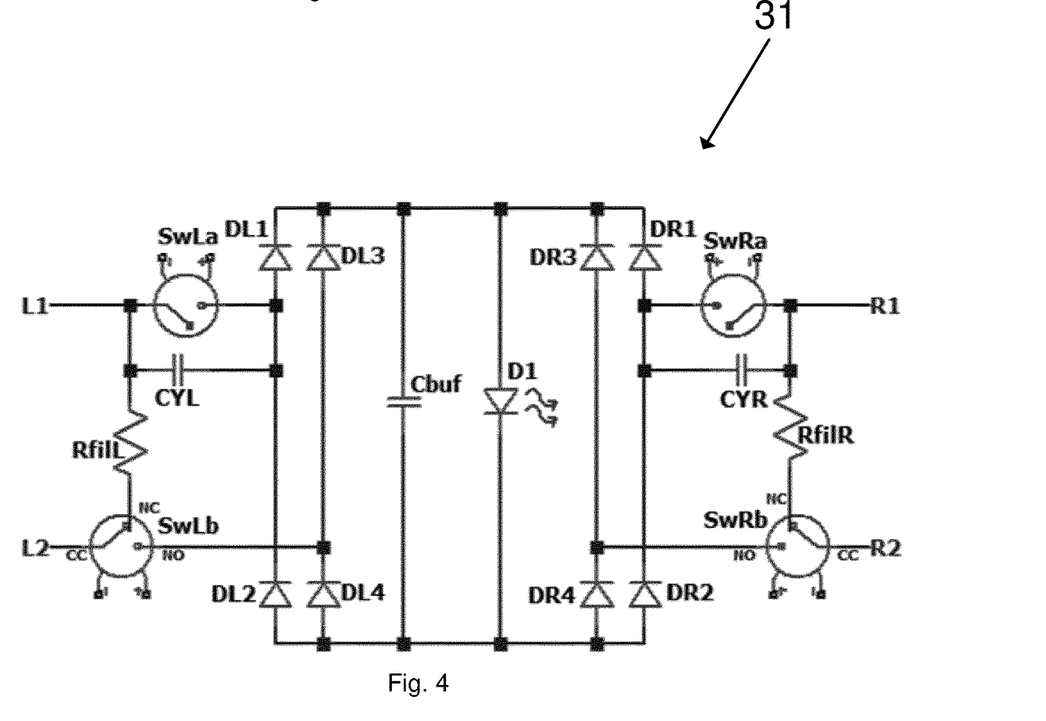
FIG. 4 shows a retrofit LED based lighting device in accordance with the present disclosure.

This is shown in FIG. 4, which shows a retrofit LED based lighting device 31 in accordance with the present disclosure.

The filament circuit is electrically removed, i.e. functionally isolated or functionally disconnected, from the circuit once the relay is activated by replacing at least one of the switches at either end of the LED lighting device by a changeover contact; its central node CC connecting to the power source, its normally closed node NC to the filament circuit, and its normally open node NO to an input of the rectifier. This allows to eliminate dissipation in the filament resistors even more during lamp on-state operation and enables/simplifies dimming.

Electrically removing the filament circuitry from the circuit during on-state lamp operation is desirable for achieving compatibility with some fixed output HF fluorescent ballasts and a big enabler for dimming operation, as no dissipation occurs in the filament circuit resistors once the relay(s)/switches are activated.

FIG. 4 also makes it apparent why it is attractive to physically place the relays each at their own end of the lamp. All signals and circuits to be switched are located at that end of the lamp.

In case of a HF ballast with lamp type recognition, the filament resistance may need to be chosen to have a resistance essentially equal to the RT value of the fluorescent lamp it is intended to replace, being four times the cold filament impedance R0 of that fluorescent lamp. The R0 value of fluorescent lamps may be standardized per lamp type and defined in the fluorescent lamp specification sheets.

As stated before, lamp type recognition via the filament impedance may be done towards or at the end of the preheat phase.

Figure 5:
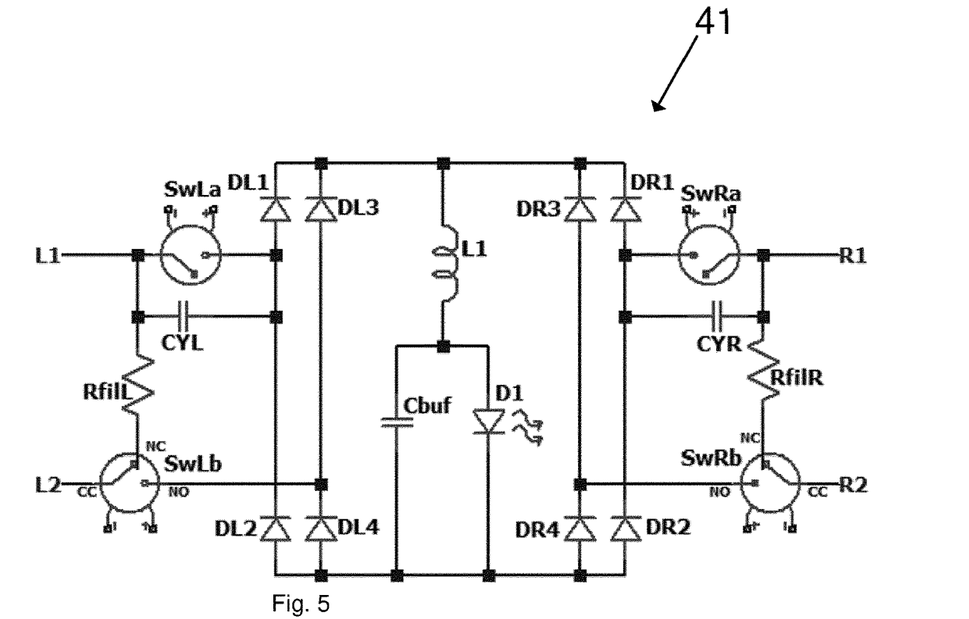
FIG. 5 shows a retrofit LED based lighting device in accordance with the present disclosure.
Figure 6:
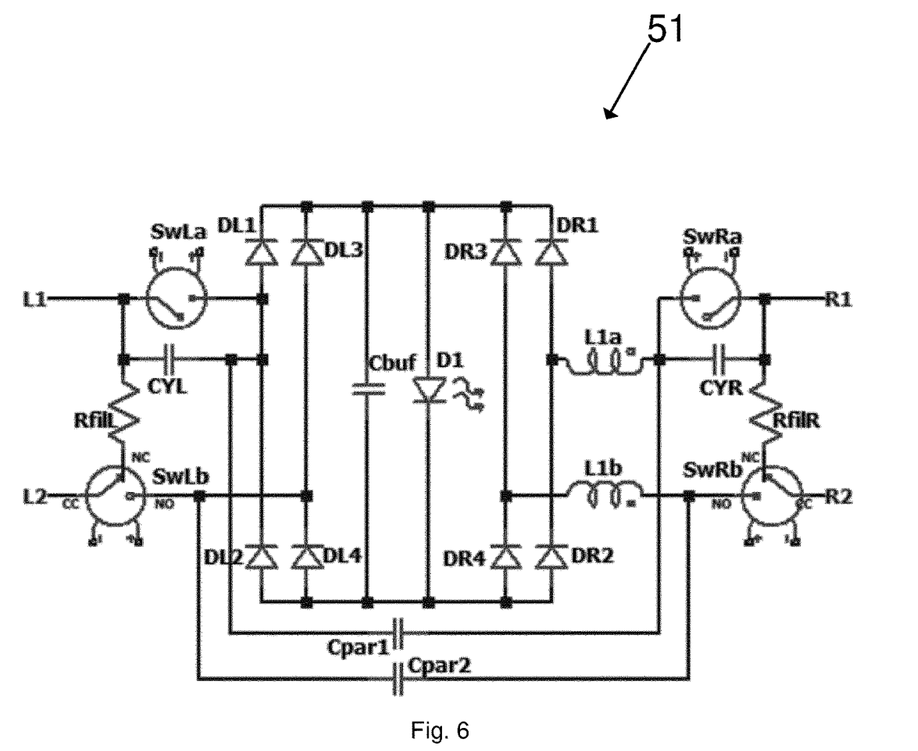
FIG. 6 shows a retrofit LED based lighting device in accordance with the present disclosure.
Figure 7:
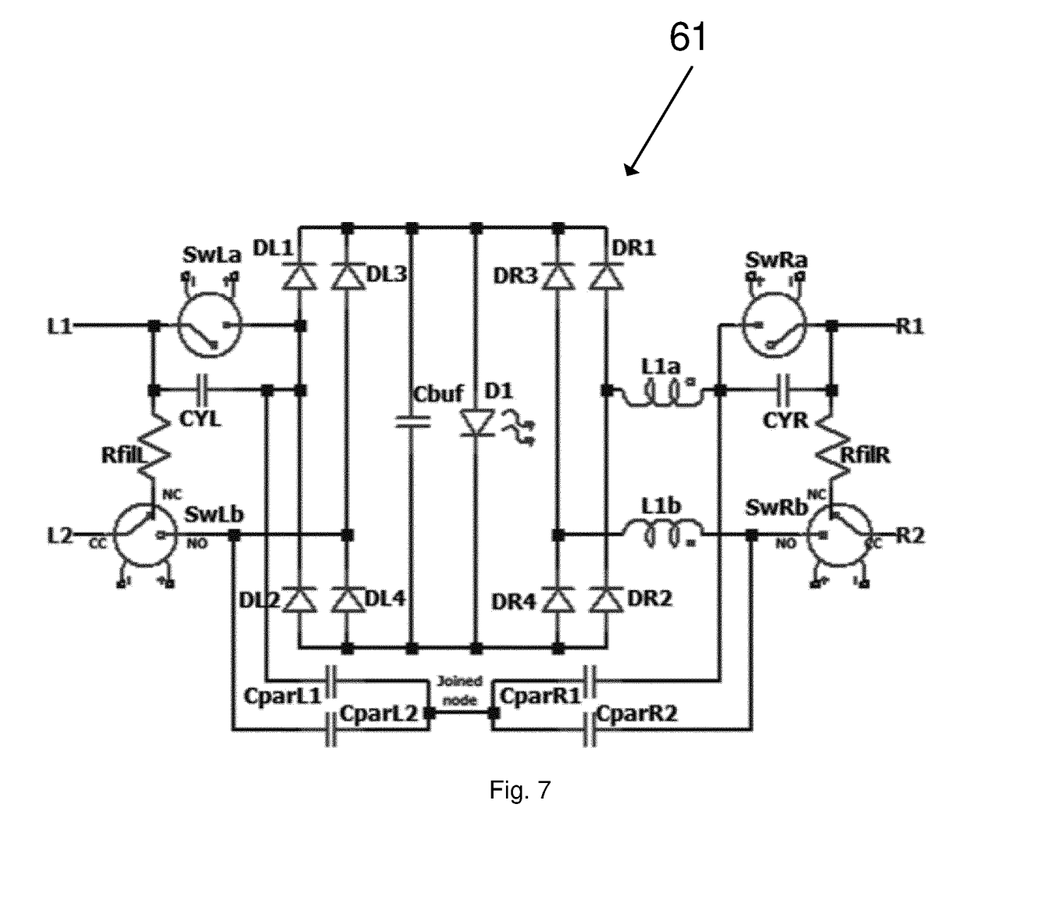
FIG. 7 shows a retrofit LED based lighting device in accordance with the present disclosure.

As indicated before, the retrofit based LED lighting devices may contain an impedance matching circuit comprising a capacitor Cpar and/or inductor L1, which is not shown in FIG. 4 but will be elucidated with respect to FIGS. 5-7.

FIG. 5 shows a further retrofit LED based lighting device 41 in accordance with the present disclosure.

As it is undefined how the rectifier input current will divide between (as depicted) DR1, DR2 and DR3, DR4, it may not be possible to use a single matching inductor L1, unless the inductor is brought to the DC side of the rectifier. Although possible, the impact on impedance matching is then changed and may not be preferred.

The above is shown in FIG. 5, wherein the inductor L1 is within the DC side of the retrofit LED based lighting device.

FIG. 6 shows a retrofit LED based lighting device 51 in accordance with the present disclosure.

As it is undefined where currents will exactly flow, i.e. L1, L2 and R1, R2, it may be needed to add at least two impedance matching capacitances Cpar, here depicted as Cpar1 and Cpar2. The right-hand side connections of Cpar1 and Cpar2 may be swapped between L1b, SwRb and L1a, SwRa.

Following the above, the rectifier shown in FIG. 6 basically has multiple inputs as it is not clear, beforehand, whether the current will flow through L1 or L2 (and R1 or R2). As such, for example, DL1 is provided for current that flows via L1 and DL3 is provided for current that flows via L2. The same, or a similar explanation, is valid for the DR1/DR3 pair, the DR4/DR2 pair and the DL2/DL4 pair.

It is noted that FIGS. 6 and 7 also show that the impedance circuit comprises an inductor with two magnetically coupled windings L1a/L1b connected to any of the further connecting terminals. More specifically, the inductor with two magnetically coupled windings L1a/L1b connect, at a first end thereof, to the AC LED driver and, at a second end thereof, to the switches provided by the pin-safety circuit.

It is noted that each of the Cpar1 and the Cpar2 may, effectively, may be implemented as two capacitors in series for realizing single fault tolerance of the retrofit LED based lighting device.

FIG. 7 shows a retrofit LED based lighting device 61 in accordance with the present disclosure.

The inventors have found that effectively implementing each of the capacitors Cpar1 and Cpar2 as two capacitors connected in series has an additional benefit. In such a case, a single joint node may be realized, wherein that single joined node is utilized for creating an electrical connection between a first end of the retrofit LED based lighting device and a second end, opposite to the first end. This is explained in more detail with respect to FIG. 7.

Here, it is shown that the capacitor Cpar1 is effectively implemented as CparL1 connected in series to CparR1. The capacitor Cpar2 is effectively implemented as CparL2 connected in series to CparR2. The inventors have found that the center taps may be connected to each other. That is, the center part of CparL1 and CparR1 may be connected to the center part of CparL2 and CparR2. This realizes the joined node as depicted in FIG. 7. The joined node may, as explained above, be implemented as an electrical connection, a PCB track, or anything alike, between the two ends of the retrofit LED based lighting device. In such a case, there is no need to provide for two separate electrical connections between the two ends of the retrofit LED based lighting device.

Other variations to the disclosed embodiments can be understood and effected by those skilled in the art in practicing the claimed invention, from a study of the drawings, the disclosure, and the appended claims, In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A double ended retrofit Light Emitting Diode, (LED) based lighting device for connection to a power source, said retrofit LED lighting device having two connecting terminals at a first end of said LED lighting device for connecting said LED based lighting device to said power source, and having two, separate, further connecting terminals at a second end for further connecting said LED based lighting device to said power source, comprising:
   at least one LED for emitting light;
   an alternating current, AC, LED driver arranged for receiving an AC current, from said power source, and for driving said at least one LED based on said received AC current,
   a filament circuit arranged in between said two separate, connecting terminals for supporting a filament current circulating back to said power source for indicating a presence of said lighting device to said power source, and
   a pin-safety circuit comprising pin-safety switches, wherein each switch is connected to a terminal of said two connecting terminals such that said AC current does not flow through said filament circuit when said pin-safety switches are closed, wherein one of the pin-safety switches comprises a changeover contact, wherein said changeover contact comprises:
   a central node arranged to be connected to said power source;
   a normally-closed node arranged to be connected to said corresponding filament circuit; and
   a normally-open node arranged to be connected to said AC LED driver,
   such that said filament circuit is functionally disconnected, when said AC current flows to, or from, said AC LED driver.

2. The retrofit LED based lighting device in accordance with claim 1, wherein said retrofit LED lighting device further comprises:
   capacitor, preferably a safety capacitor, connected in parallel over said pin-safety switches, for providing said retrofit LED lighting device with a reduced amount of power for controlling said pin-safety switches when said pin-safety switches are open.

3. The retrofit LED based lighting device in accordance with claim 1, further comprising:
   a further filament circuit arranged in between said two separate, further connecting terminals for supporting a filament current circulating back to said power source for indicating a presence of said lighting device to said power source, and wherein said pin-safety circuit comprises further pin-safety switches, wherein each further switch is connected to a separate further connecting terminal of said two, separate, further connecting terminals such that said AC current does not flow through said further filament circuit when said further pin-safety switches are closed.

4. The retrofit LED based lighting device in accordance with claim 3, wherein at least one of said further pin-safety switches comprises a changeover contact, wherein said changeover contact comprises:
   a central node arranged to be connected to said power source;
   a normally-closed node arranged to be connected to said corresponding further filament circuit;
   a normally-open node arranged to be connected to said AC LED driver,
   such that said further filament circuit is functionally disconnected when said AC current flows to or from, said AC LED driver.

5. The retrofit LED based lighting device in accordance with claim 1, wherein said LED based lighting device further comprises:
   an impedance matching circuit for matching an input impedance of said AC LED driver to an output impedance of said power source.

6. The retrofit LED based lighting device in accordance with claim 5, wherein said impedance matching circuit comprises at least one of:
   an inductor placed behind an output of said AC LED driver;
   an inductor with two magnetically coupled windings, wherein each winding is connected to a separate terminal of any of:
   said two, separate, connecting terminals or
   said further connecting terminals;
   at least two inductors, wherein each of said two inductors is connected to a separate terminal of said connecting terminals or of said further connecting terminals.

7. The retrofit LED based lighting device in accordance with claim 5, wherein said impedance matching circuit comprises two impedance matching capacitors, wherein each of said two impedance matching capacitors connects to a separate terminal of said two, separate, connecting terminals and to a separate terminal of said two, separate, further connecting terminals.

8. The retrofit LED based lighting device in accordance with claim 7, wherein:
   a first of said two impedance matching capacitors comprises two capacitors placed in series between one of said two, separate, connecting terminals and one of said two, separate, further connecting terminals; and
   a second of said two impedance matching capacitors comprises two capacitors placed in series between another one of said two, separate, connecting terminals and another one of said two, separate, further connecting terminals,
   wherein a center tap of said two capacitors in series between one of said two, separate, connecting terminals and one of said two, separate, further connecting terminals is connected to a center tap of said two capacitors placed in series between another one of said two, separate, connecting terminals and another one of said two, separate, further connecting terminals.

9. A method of controlling a retrofit Light Emitting Diode, LED, based lighting device in accordance with claim 1, wherein the method comprises:
   receiving, by said AC LED driver, from said power source, an AC current;

driving, by said AC LED driver, said at least one LED based on said received AC current;
supporting, by said filament circuit, said filament current to circulate back to said power source for indicating a presence of said lighting device to said power source; and
controlling, by said pin-safety circuit, said pin-safety switches connected to both said two, separate, connecting terminals such that said AC current does not flow through said filament circuit when said pin-safety switches are closed.

\* \* \* \* \*